United States Patent [19]

Konishi et al.

[11] Patent Number: 5,149,135
[45] Date of Patent: Sep. 22, 1992

[54] FRONT SEAT SHOULDER BELT AND SEAT BACK SUPPORTING STRUCTURE

[75] Inventors: Takeshi Konishi; Fumiyuki Otani, both of Hiroshima; Hisao Muramoto, Yamaguchi; Isao Hirashima, Hiroshima; Yoshinobu Nomura, Kure; Shigefumi Kohno, Hiroshima, all of Japan

[73] Assignee: Mazda Motor Corporation, Hiroshima, Japan

[21] Appl. No.: 759,649

[22] Filed: Sep. 13, 1991

Related U.S. Application Data

[63] Continuation of Ser. No. 365,850, Jun. 15, 1989, abandoned.

[30] Foreign Application Priority Data

Jun. 15, 1988 [JP] Japan ................. 63-79737[U]
Jun. 15, 1988 [JP] Japan ................. 63-79739
Jun. 15, 1988 [JP] Japan ................. 63-148644[U]

[51] Int. Cl.⁵ .................... B60R 22/24; B60R 22/00
[52] U.S. Cl. .................... 280/806; 280/808
[58] Field of Search ........... 280/801, 808, 806; 297/483, 468, 478

[56] References Cited

U.S. PATENT DOCUMENTS

| | | | |
|---|---|---|---|
| 4,181,326 | 1/1980 | Hollowell et al. | 297/478 |
| 4,431,233 | 2/1984 | Ernst | 297/483 |
| 4,718,696 | 1/1988 | Koide et al. | 280/801 |
| 4,725,076 | 2/1988 | Taylor | 280/808 |
| 4,726,605 | 2/1988 | Carter | 280/808 |
| 4,817,754 | 4/1989 | Muramoto | 280/808 |

FOREIGN PATENT DOCUMENTS

| | | | |
|---|---|---|---|
| 223582 | 5/1987 | European Pat. Off. | 280/808 |
| 2253307 | 5/1974 | Fed. Rep. of Germany | 297/478 |
| 53165527 | 5/1952 | Japan . | |
| 547097 | 4/1979 | Japan . | |
| 6137055 | 3/1986 | Japan . | |
| 0130450 | 6/1988 | Japan | 280/808 |

*Primary Examiner*—Kenneth R. Rice
*Assistant Examiner*—Karin Tyson
*Attorney, Agent, or Firm*—Fleit, Jacobson, Cohn, Price, Holman & Stern

[57] ABSTRACT

A seat belt device for fastening a passenger seated on a seat comprises a shoulder belt carried by a seat back. A support strap is fixed at one end to the seat back and extends rearwardly. An anchor member is mounted on a body member of the vehicle rearward of the seat back for carrying the support strap. A retractor is mounted on a body member for winding up and retracting the support strap. A lock mechanism is provided in the retractor for preventing the support means from being drawn out from the retractor when a horizontal acceleration acting on the retractor is greater than a predetermined value. The seat belt device is reliable in case of an emergency and provides improved visuality.

12 Claims, 21 Drawing Sheets

FRONT SEAT SHOULDER BELT AND SEAT BACK SUPPORTING STRUCTURE

This is a continuation of application Ser. No.07/365,850, filed Jun. 15, 1989, now abandoned.

CROSS-REFERENCE TO THE RELATED APPLICATIONS

The present application relates to co-pending U.S. patent application Ser. No. 186,220 entitled "AUTOMOTIVE SEAT BELT SYSTEM AND RETRACTOR DEVICE", now U.S. Pat. No. 4,817,754, which is assigned to the same assignee as the present application.

BACKGROUND OF THE INVENTION

1. Field of the invention

The present invention relates to an automotive seat belt device, more specifically to a front seat belt device for an automotive vehicle.

2. Description of the Prior art

A seat belt device for a passenger in a front seat is provided with a shoulder belt member which prevents the passenger from moving undesirably forwardly by fastening his body on a front member seat in the case of an accident.

As shown in Japanese Utility Model Public Disclosure No. 61-37055 laid open to the public in 1986, the shoulder belt member is extended from a retractor mounted at a lower portion of a center pillar upwardly along an, inner wall surface of the center pillar and engaged with a hanger member mounted on an upper portion of a center pillar or an intermediate portion of a roof side rail and thereafter extended to a buckle arranged by a seat cushion to fasten an upper body portion of the passenger.

It should, however, be noted that this type of seat belt device is disadvantageous, as will be clear from the following points. A webbing or a part of the shoulder belt member along the center pillar appears in a visual range of a passenger in a rear seat to deteriorate a riding comfort. Further, the hanger member affects a comfort of the front seat passenger. Particularly, in the case of a pillarless hard top type automotive vehicle, the shoulder belt is arranged to extend downwardly from an intermediate portion of the roof side rail so that an undue load may act on the intermediate portion in an accident in addition to a deterioration of looking thereof.

Japanese Utility Model Public Disclosure No. 53-165527 laid open to the public in 1978 proposes a pillarless hard top type automotive vehicle in which a shoulder belt member is extended rearwardly through a guide member mounted on a shoulder portion of a front seat back and a rear end of the extended portion of the shoulder belt member is wound in a retractor mounted on an inner panel of a rear body portion. With this structure, a webbing of the belt device is arranged lower than a window portion so that a visuality can be improved. It should however be noted that the extended portion of the shoulder belt member may be in the way when a rear seat passenger gets o in and out of the vehicle. In addition, a mounting for the retractor is projected rearwardly which may cause deterioration in riding comfort for the rear seat passenger.

Japanese Patent Publication No. 54-7097 discloses a seat belt device provided with a shoulder belt member wound on a retractor mounted on a driver's seat back and an automatic winding belt device for preventing the belt member from exposure from a window portion and for supporting the seat back against an impact in an accident. In this structure, a retractor of the automatic winding belt device provided with a lock mechanism for locking the device in case of accident to prevent a belt member from being drawn out is mounted on the front seat back to project rearwardly so that a riding comfort in a rear seat passenger is deteriorated as well. In addition, when a reclining operation of the seat back is made quickly, a lock mechanism may be undesirably actuated to lock the retractor.

Specifically, when the seat back is moved for rotation beyond 15 degrees the lock mechanism is actuated to lock the belt supply.

SUMMARY OF THE INVENTION

It is therefore an object of the present invention to provide a seat belt device which is reliable in case of an emergency.

It is another object of the present invention to provide a seat belt device which can provide an improved visuality for a rear seat passenger.

It is still another object of the present invention to provide a seat belt device which does not affect in the case where a passenger gets in and get off.

It is yet another object of the present invention to provide a seat belt device in which a lock mechanism therefor is reliable.

It is further object of the invention to provide a seat belt device which can provide a riding comfort.

It is still further object of the invention to provide a seat belt device which has a good appearance without deteriorating a visuality of a passenger.

The above and other objects of the invention can be accomplished by a seat belt device for fastening a passenger seated on a seat device of a vehicle comprising shoulder belt means carried by a seat back member of the seat device, support means 10 fixed at one end to the seat back member and extending rearwardly of the vehicle, anchor means mounted on a body member of the vehicle rearward of the seat back member for carrying the support means, retractor means mounted on a body member for winding to retract the support means, and lock means provided in the retractor means for preventing the support means from being drawn out from the retractor means when a horizontal acceleration acting on the retractor means is greater than a predetermined value.

The anchor means and the retractor means can be mounted on a rear door.

In another preferred embodiment of the present invention, the seat belt device is provided with guide means mounted on the seat back member for carrying the shoulder belt means and the support means, first anchor section means mounted on a center pillar for carrying the shoulder belt means from the guide means at a position downward of a window portion, and second anchor section means mounted on the body in the vicinity of a front end portion of the rear door for carrying the support means extending rearwardly from the guide means and retractor means for winding to retract the support means.

The support means carries the seat back member not to move forwardly in case of an emergency.

The above and other features of the present invention will be apparent from the following description taking reference to the accompanying drawings.

DESCRIPTION OF THE PREFERRED EMBODIMENT

Figure 1:
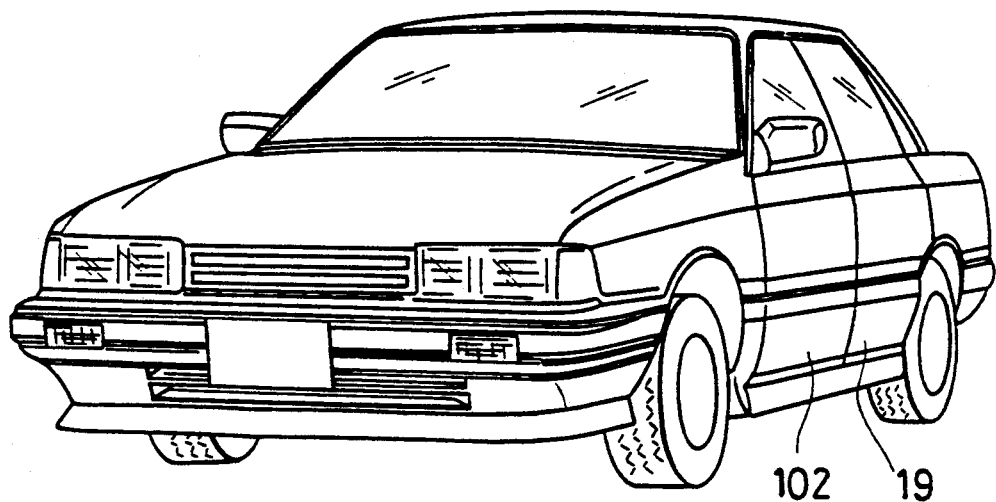
FIG. 1 is a perspective view showing a vehicle provided with a seat belt device in accordance with a preferred embodiment of the present invention.
Figure 2:
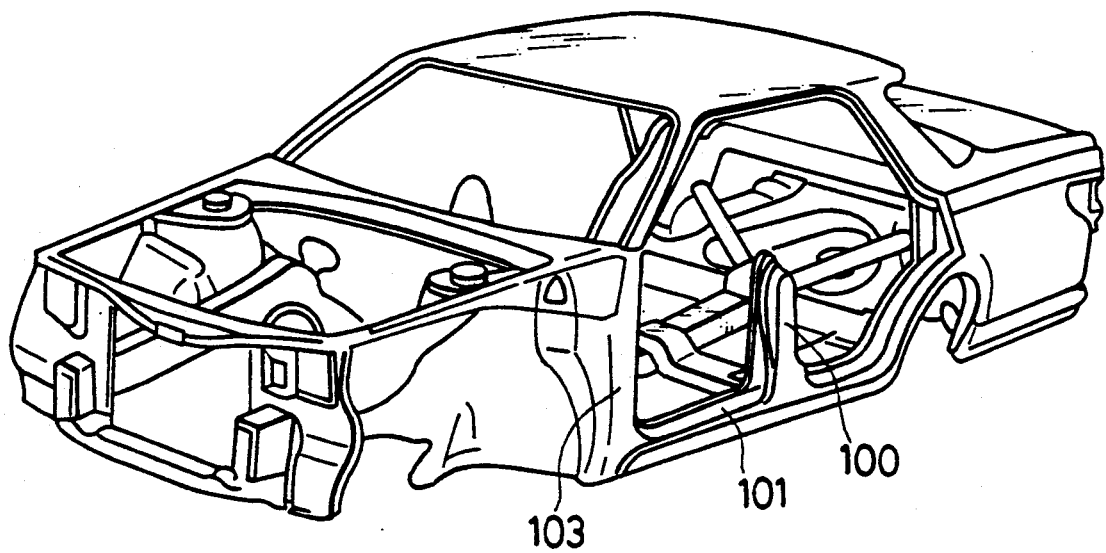
FIG. 2 is a perspective view showing inside of the vehicle.

Referring to the drawings, specifically to FIGS. 1 and 2, there is shown a body of a vehicle of a pillarless hardtop to which the present invention can be applied. The vehicle is provided with a center pillar 100 which is connected to a side sill 101 at the lower end and is belt-line high. The vehicle is provided with a pair of front doors 102 and pair of rear doors 19. Each of the front doors 102 is hinged on a hinge pillar 103, and each of the rear doors 19 is hinged on the center pillar 100.

Figure 3:
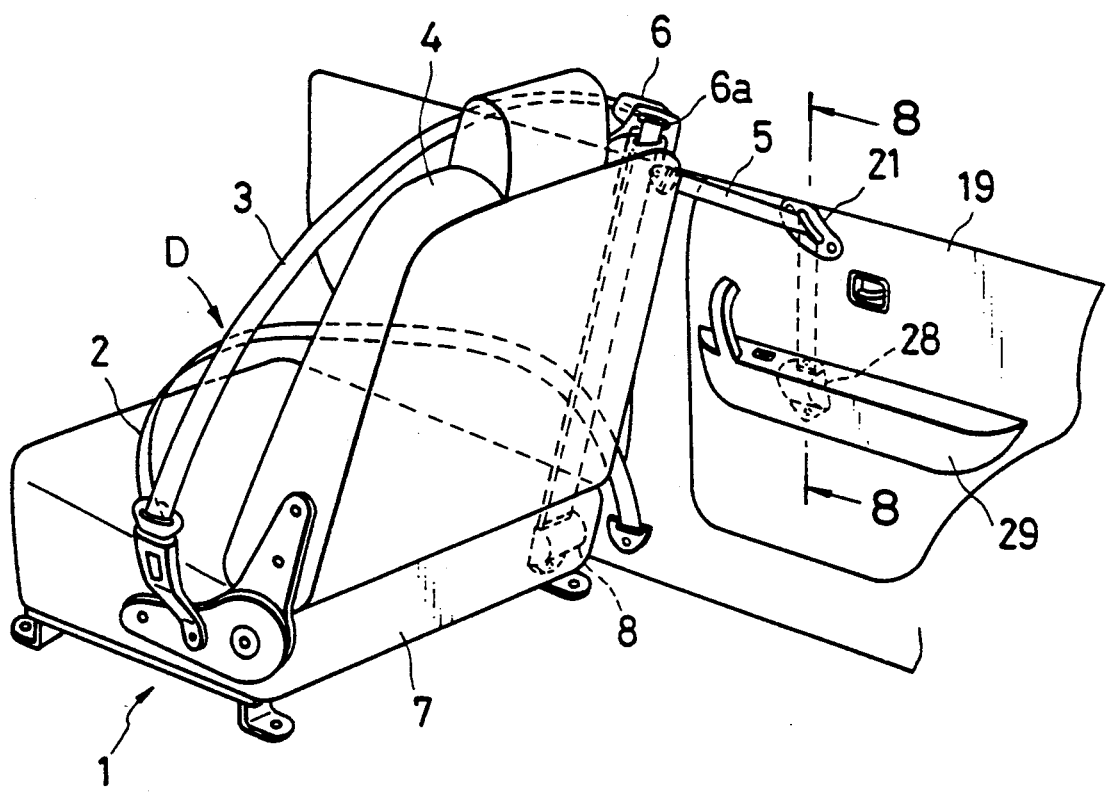
FIG. 3 is a perspective view showing a front seat and a seat belt device mounted on the seat.
Figure 4:
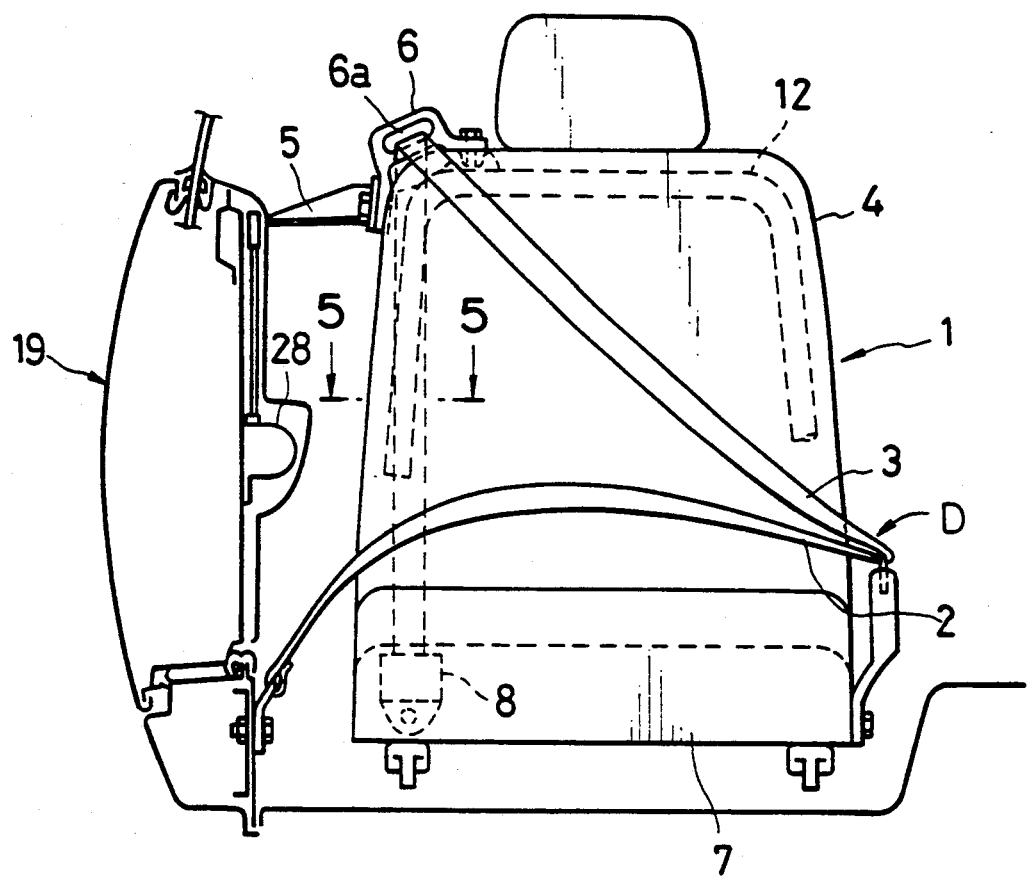
FIG. 4 is a front view of the front seat and the seat belt device.
Figure 5:
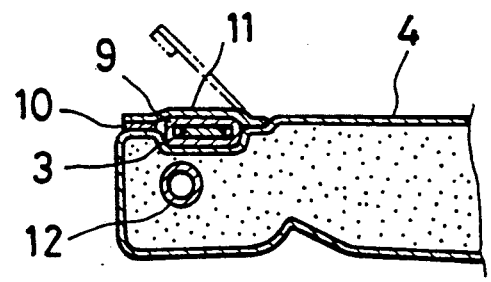
FIG. 5 is a sectional view taken along a line V—V in FIG. 4.
Figure 6:
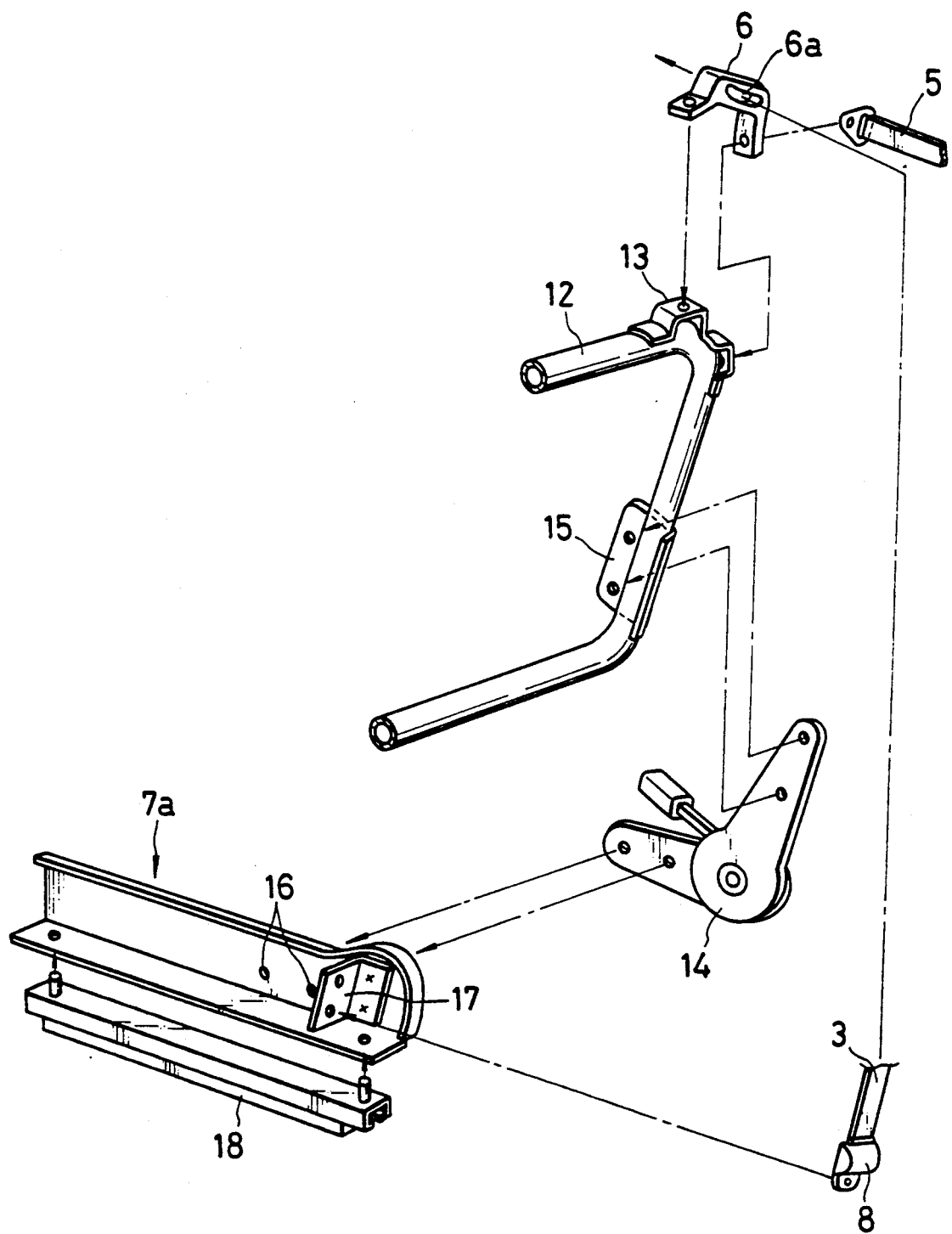
FIG. 6 is a exploded perspective view showing a mounting section of a shoulder belt and a support strap.

Referring to FIGS. 3 and 4, a front seat belt device D is provided for a driver's seat or front seat 1. The seat belt device D comprises a lap strap or belt 2 for fastening a waist of a passenger, a shoulder belt 3 extending obliquely from a shoulder to a waist for embracing an upper body portion of the passenger, a support strap or belt 5 connected with a vehicle body member such as a pillar and a door for carrying a seat back 4 of the front seat 1. Specifically the support strap 5 is provided for preventing the seat back 4 from falling down forwardly in an emergency such as an accidental collision. The shoulder belt 3 is wound and taken up by a retractor 8 mounted on a cushion side frame 7a of a seat cushion 7 of the front seat 1. The belt 3 is extended from the retractor 8 upwardly, engaged with a guide member 6 through an opening 6a and then extended downwardly. The shoulder belt 3 is received and carried by a pipe member 9 of an elongated configuration in section as shown in FIG. 5. The pipe member 9 is covered by a cover member 11 which is removably mounted on the seat back 4 by means of an engaging member 10 such as tape fastener. In the seat back is arranged a seat back frame 12 on which a mounting member 13 for the guide member 6 and a mounting member 15 for a reclining knuckle 14 are mounted as shown in FIG. 6. The cushion side frame 7a is provided with at least one mounting hole 16 for the reclining knuckle 14 and a bracket 17 for mounting the retractor 8 for the shoulder belt 3. A seat slider 18 is mounted on a lower side of the cushion side frame 7a. One end of the support strap 5 is connected with one side of the guide member 6 and thus connected with the seat back 4 as shown in FIG. 4.

Figure 7:
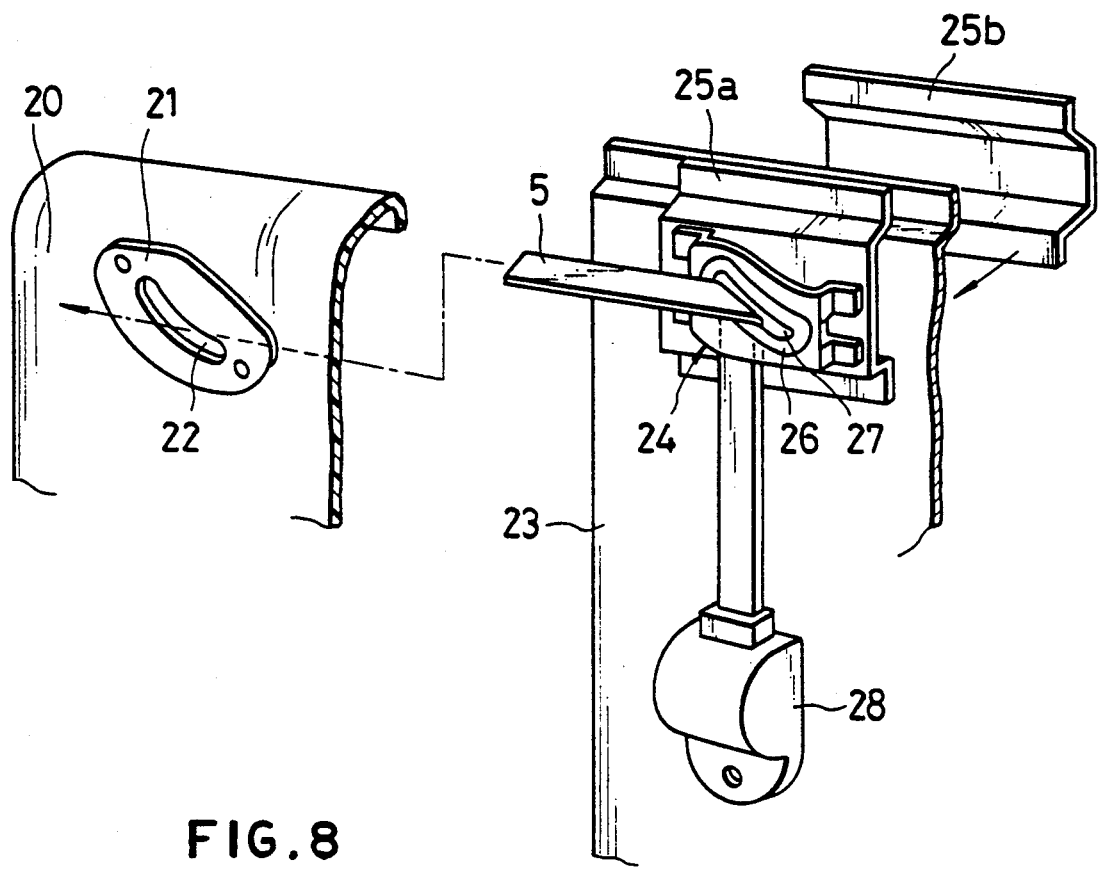
FIG. 7 is a exploded perspective view showing an anchor portion of the support strap.
Figure 8:
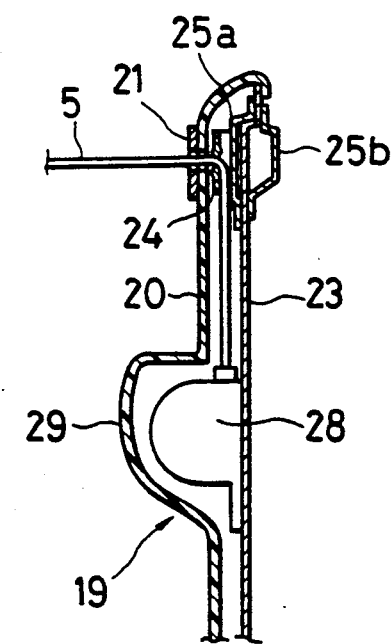
FIG. 8 is a sectional view taken along a line VIII—VIII in FIG. 3.

As shown in FIG. 7 and FIG. 8, the support strap 5 is extended rearwardly from the guide member 6 to a bezel 21 mounted on a front and upper portion of a trim member 20 of the rear door 19 which is located rearward of the seat back 4. Then the support strap 5 is extended downwardly between the trim member 20 and a rear door inner panel 23 through a hole 22 of the bezel 21 and an anchor member 24 mounted on a front end portion of the rear door inner panel 23. The hole 22 is of an arcuate configuration. The anchor member 24 is mounted on a reinforcement 25a joined with the rear door inner panel 23. A belt guide hole 27 with a metallic rim member 26 is formed in the anchor member 24 for carrying the support strap 5 in correspondence with the hole 22 of the bezel 21. A reinforcement 25b is mounted on an external surface of the rear door inner panel 23 for reinforcing a mounting structure where the anchor is mounted. The end portion of the support strap 5 extending downwardly through the guide hole 27 is taken up by a retractor 28 mounted on the rear door inner panel 23. The retractor 28 is arranged in a space defined by an arm rest portion 29 of the trim member 20. The retractor 28 is provided with a coil spring for winding the support strap 5 and a braking mechanism for restricting the support strap 5 from being unduly quickly drawn out of the retractor 28. As the front seat 1 is moved forward and backward, the retractor 28 carries the support strap 5 in a manner of allowing the support strap 5 to be drawn and taken up in accordance with the movement of the front seat 1.

Figure 9:
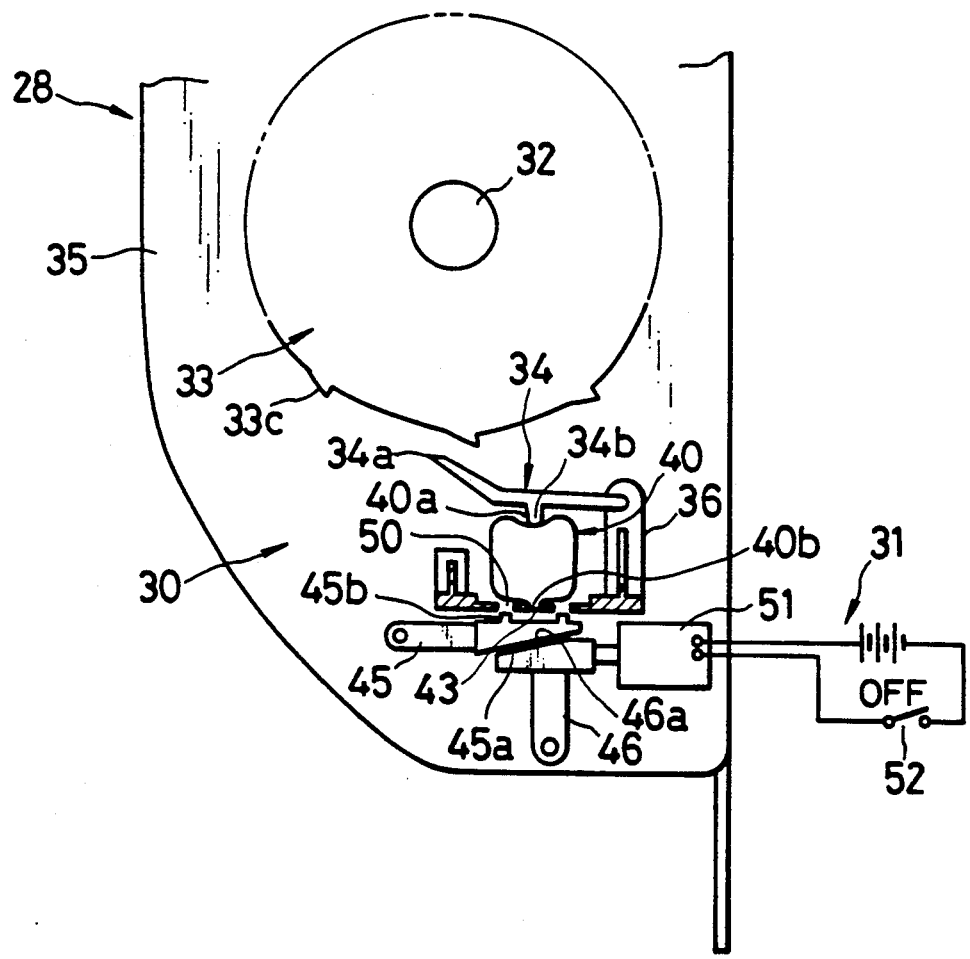
FIG. 9 is a side view of a retractor.
Figure 10:
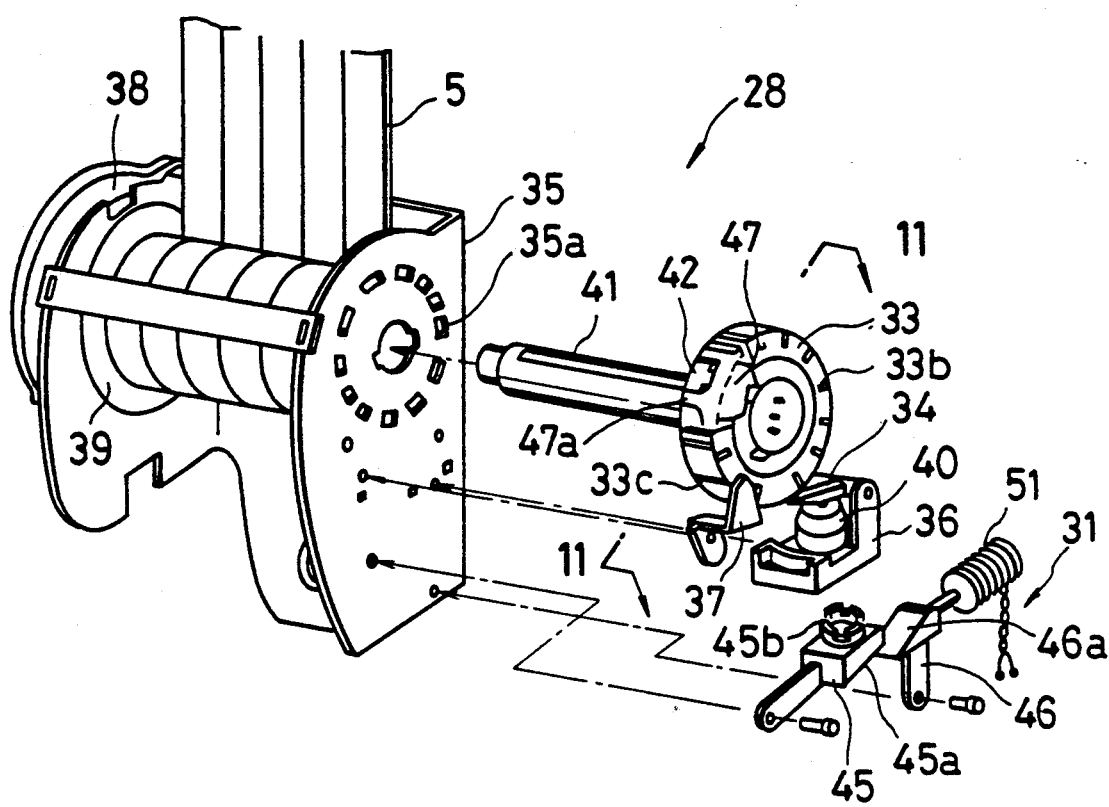
FIG. 10 is a exploded perspective view of the retractor.
Figure 11:
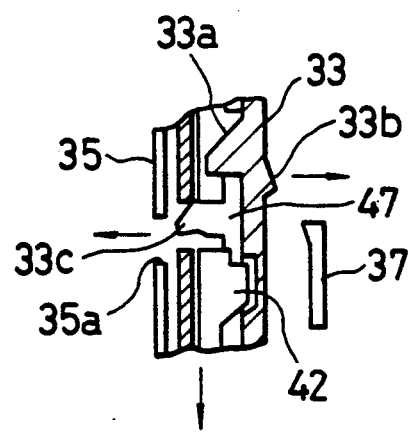
FIG. 11 is a fragmentary cross-sectional view taken along a line XI—XI in FIG. 10.

As shown in FIGS. 9, 10 and 11, the retractor 28 is also provided with a lock mechanism 30 for locking the support strap not to be drawn out in case of an emergency such as collision by accident, and a control device 31 for controlling the lock mechanism 30.

The retractor 28 is provided with a retractor shaft 41, a ratchet wheel 33, a ratchet lever 34 and a weight 40.

The retractor shaft 41 is supported for rotation on a retractor base 35 which is channel shaped configuration in section in a coaxial relationship with the a spool 39. The support strap 5 is wound on the spool 39 and urged by a take-up spring 38 in a take-up direction in which the support strap 5 is taken up.

The ratchet wheel 33 together with a latch ring 47 and a cam plate 42 is connected to an end of the ratchet wheel 33 to be rotated therewith. The latch ring 47 and the cam plate 42 are always rotated together with the retractor shaft 41. The ratchet wheel 33 is rotated with the retractor shaft 41 in the take-up direction. However, when an abrupt rotational force acts on the retractor shaft 41 in a draw direction in which the support strap 5 is drawn out or a force against a rotative movement of the ratchet wheel 33 acts thereon, the latch ring 47 rides on an inclined portion 33a formed on an inner side of the rachet wheel 33 and is displaced toward the retractor base 35. As a result, pawls 47a of the latch ring 47 are brought into engagement with perforations 35a in the retractor base 35 to prevent the support strap 5 from being drawn out. The ratchet wheel 33 is formed with first and second ratchets 33b and 33c at the circumferential surface. The first ratchets 33b is engaged with a tooth 37 arranged adjacent to the ratchet wheel 33 for preventing the ratchet wheel 33 from rotation. Thus, the support strap 5 is prevented from an abrupt drawing out. The second ratchet 33c is adapted to be engaged with the ratchet lever 34.

As shown in FIG. 9, the ratchet lever 34 is swingably mounted on a weight support member 36 at one end in an up and down direction. The weight support member 36 is mounted on the retractor base 35. When the ratchet lever 34 is swung upwardly beyond a predetermined angular amount, the other end portion 34a thereof abuts against a surface of the ratchet wheel 33. When the ratchet wheel 33 is rotated in the draw direction while the end portion 34a of the ratchet lever 34 is in abutment against the ratchet wheel 33, the end portion 34a of the ratchet lever 34 is engaged with the second ratchets 33c of the ratchet wheel 33 to prevent the support strap 5 from being drawn out. The ratchet lever 34 is formed with an arcuate projection 34b projecting downwardly at an intermediate portion thereof. The ratchet lever 34 is carried by a weight 40 through the projection 34b.

The weight 40 is substantially cylindrical in shape and is provided with a spherical recess 40a and a projection 40b formed on top surface and the bottom surface coaxially with the cylindrical weight 40. The bottom surface of the weight 40 around the projection 40b is slightly inclined. The weight support member 36 with the projection 40b received in a locator hole 43 is disposed so that when the weight 40 is placed on the weight support member 36 in the manner described above, the projection 34b of the rachet lever 34 abuts against the center of the spherical recess on the top surface of the weight 40.

Figure 12:
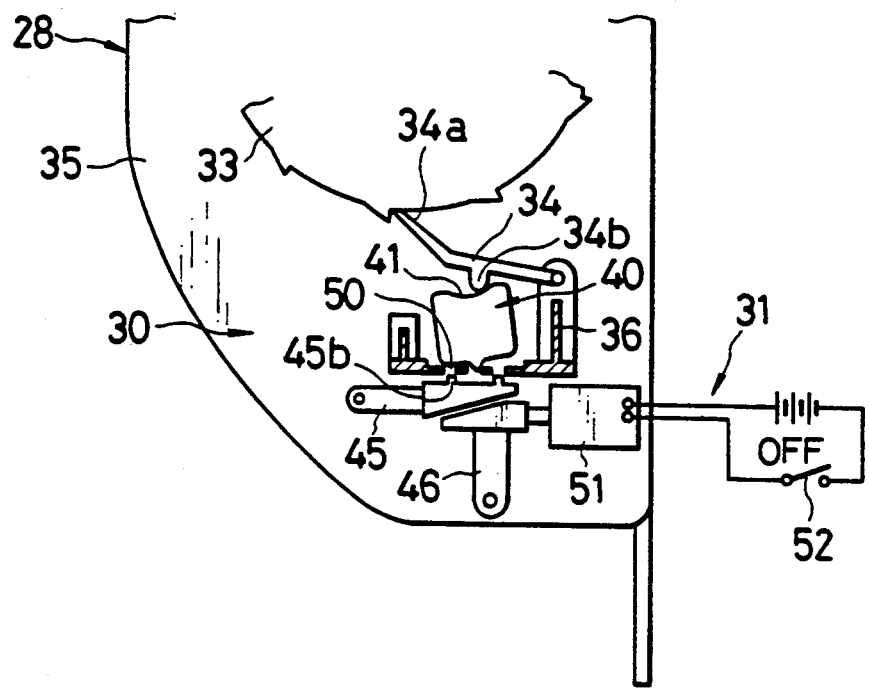
FIG. 12 and FIG. 13 are side views of the retractor in various conditions.

The weight 40 is swung according to the horizontal acceleration of the door 19. When the horizontal acceleration is substantially zero, the weight 40 stands vertical as shown in FIG. 9, while when the horizontal acceleration exceeds a predetermined value, the weight 40 is inclined as shown in FIG. 12. When the weight 40 is inclined, the abutment portion of the projection 34b of the ratchet lever 34 and the spherical recess 40a of the weight 40 changes. That is, when the weight 40 is erected, the projection 34b abuts against the central portion, or the lowest portion of the spherical recess 40a, and accordingly, when the weight 40 is inclined and the abutment portion of the projection 34b and the spherical recess 40a changes, the projection 34b is pushed upward to swing upward the ratchet lever 34. As a result, the end 34a of the ratchet lever 34 is brought into abutment against the ratchet wheel 33. Since the weight 40 has substantially spherical configuration, the same result can be obtained irrespective of the direction of the inclination of the weight 40. The value of acceleration at which the weight 40 is inclined by an angle sufficient to bring the ratchet 34 into abutment against the ratchet wheel 33 is selected so that when the position of the driver and/or passenger is to be held as when running a rough road, the ratchet lever 34 is brought into abutment against the ratchet wheel 33 to prevent the support strap 5 from being drawn out.

Figure 13:
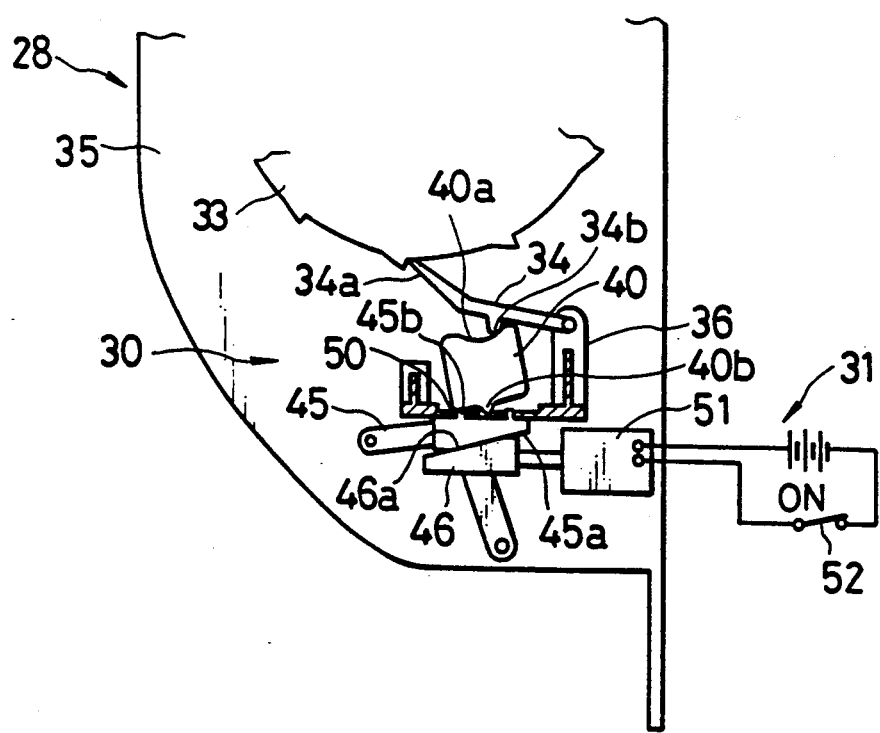

As shown in FIG. 13, the control device 31 is disposed below the weight support member 36. The control device 31 comprises a pair of lock acceleration control members 45, 46 mounted for rotation on the retractor base 35, and a solenoid 51 for driving the lock acceleration control member 46. The lower surface of the lock acceleration control member 45 and the upper surface of the lock acceleration control member 46 are respectively formed with inclined surfaces 45a and 46a facing to each other. The lock acceleration control member 45 is formed with four projections 45b projecting upwardly. Each of the four projections 45b having a predetermined height are located on a circle of a predetermined diameter. In addition, four through holes 50 are formed in the weight support member 36. The holes 50 are located on a circle around the locator hole 43. The four projections 45b are adapted to project from the upper surface of the weight support member 36 through the holes 50 to a predetermined height when the lock acceleration control member 45 is swung upwardly by a predetermined angle.

The solenoid 51 is actuated when the door 19 is opened based on a signal from a door switch 52. When actuated, the solenoid 51 drives the lock acceleration control member 46 toward the lock acceleration member 45. When the lock acceleration member 46 is moved to abut the member 45, the member 45 is swung upward as a result of abutment of the inclined surfaces 45a and 46a.

When the lock acceleration control member 45 is swung upwardly and the projections 45b project upwardly from the upper surface of the weight support member 36, the weight 40 comes to be supported by both the weight support member 36 and the projections 45b of the lock acceleration control member 45. Since the projections 45b support the weight 40 at portions radially away from the projections 40b of the weight 40, the weight 40 is not swung until the horizontal acceleration becomes extremely high, as upon collision.

The retractor 8 is provided with a lock mechanism similar to the mechanism 30.

According to the above embodiment of the present invention, the shoulder belt 3 is extended downwardly through the guide member 6 mounted on an outer side shoulder portion of the seat back 4 and taken up by the retractor 8 mounted on the cushion side frame 7a of the seat cushion 7 located at a lower portion of the front seat 1. Thus, the shoulder belt 3 is prevented from being exposed outside of the vehicle through the window portion thereof. This structure positions the shoulder belt 3 at a proper position and improves a view for a passenger in a rear seat because webbing of the shoulder belt 3 does not appear in a visual range of the passenger, and therefore can improve riding comfort.

The support strap 5 carries the seat back 4 so that it does not swing down forwardly in an emergency so that a safety for the passenger can be improved. The retractor 28 for the support strap 5 is not provided in the seat back 4 but in the rear door 19 so that the lock mechanism 30 is prevented from an undesirable actuation caused by a reclining operation of the seat back 4.

Figure 14:
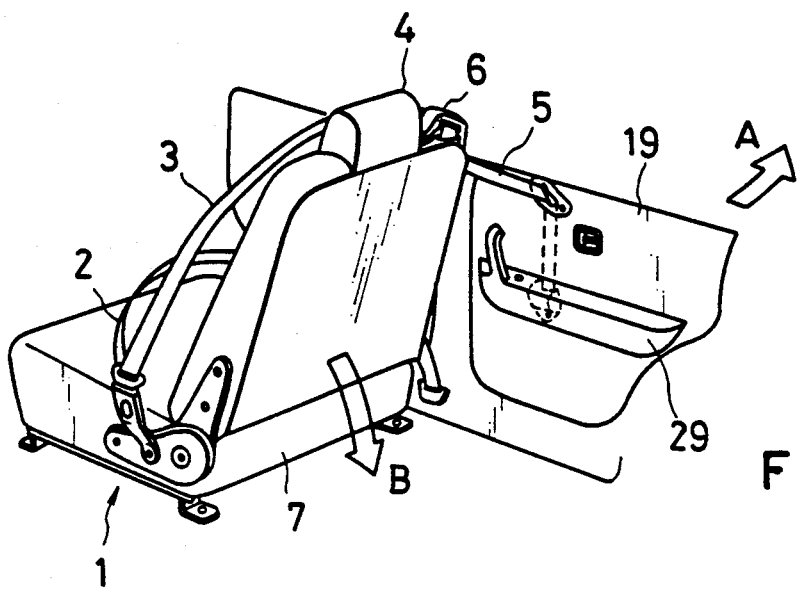
FIG. 14 is a perspective view showing the front seat and the seat belt device mounted on the seat.
Figure 15:
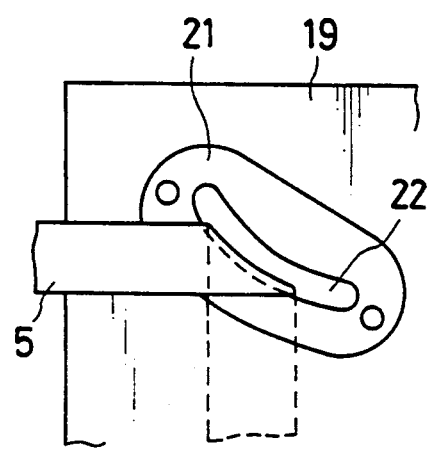
FIG. 15, FIG. 16 and FIG. 17 are fragmental views of an anchor portion of belt and strap under various conditions.
Figure 16:
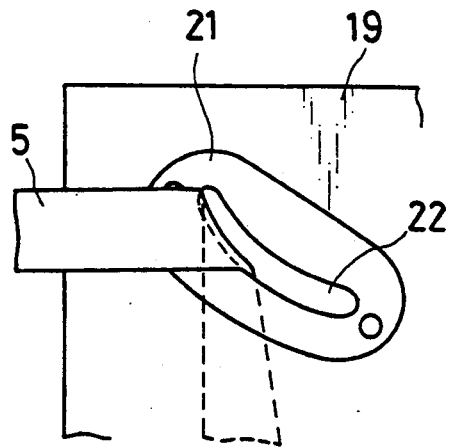
Figure 17:
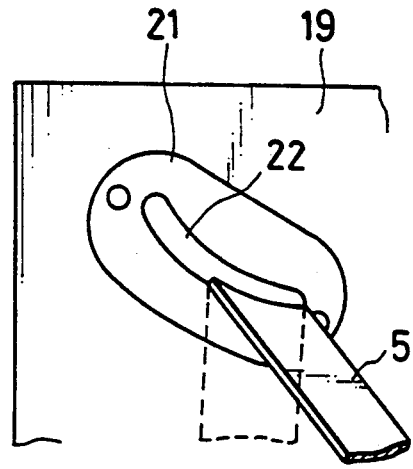

As shown in FIG. 15, the support strap 5 is pulled through the guide hole 22 toward the guide member at one hand and toward a retractor 28 at the other hand so that the support strap is positioned to be engaged with the bezel 21 at a substantially central portion of thereof in the guide hole 27. When the rear door 19 is pivotally moved outwardly as shown by an arrow A in FIG. 14 to be opened, the support strap 5 is moved forwardly and upwardly in the guide hole 27 as shown in FIG. 16. On the other hand, when the seat back 4 is swung rearwardly by operating the reclining knuckle 14 for reclining, the guide member 6 is moved rearwardly so that the support strap 5 is moved downwardly and rearwardly along the rim member 26. It will be understood that the support strap 5 can be always stably carried by the bezel 21 of the anchor portion 24 irrespective of positions of the seat back 4 and the rear door 19 without producing any substantial deformation such as torsional deformation in the support strap 5.

As shown in FIG. 9, the control device 31 enables the lock mechanism 30 to be actuated when an acceleration acting thereon exceeds a predetermined reference value wherein the reference value is set corresponding to an open and close condition of the rear door 19 independently. When the rear door is closed, the lock mechanism 30 is actuated by a relatively small acceleration so as to restrict the support strap 5 from being drawn out. For instance, when the vehicle runs on a rough path, the support strap 5 is locked so as to be drawn out to fasten a passenger effectively to the seat 1. On the other hand, when the door 19 is opened, the lock mechanism 30 is not actuated until an acceleration reaches a relatively great value so that the support strap is not locked based on an acceleration acting thereof caused by a reclining operation or door opening operation. Thus, a desirable operation of the lock mechanism 30 can be obtained.

Figure 18:
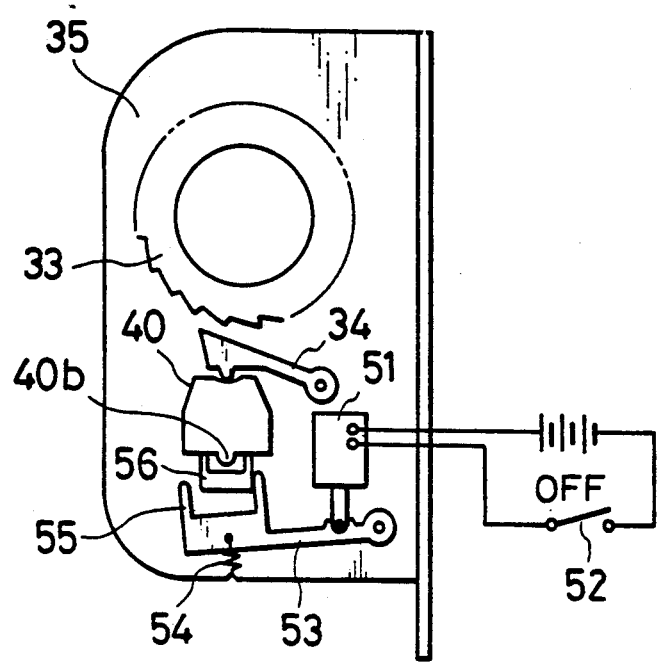
FIG. 18 is a side view showing another structure of the retractor.
Figure 19:
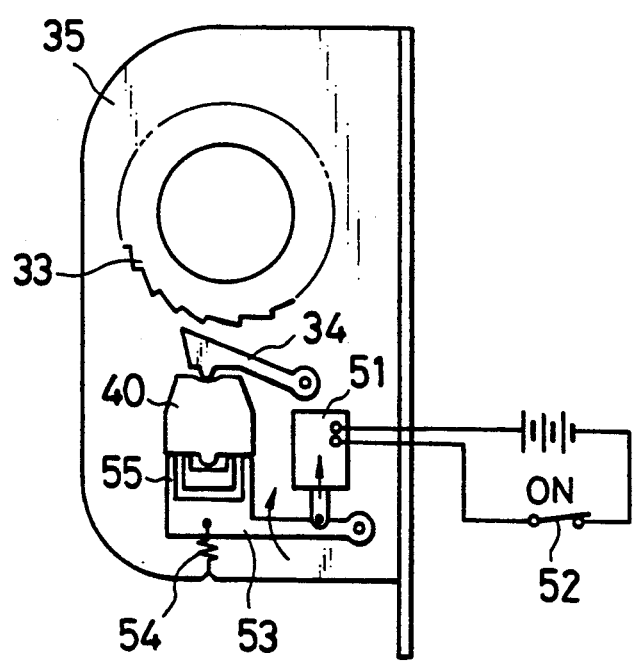
FIG. 19 is a side view of the retractor of FIG. 18 in operation.

Referring to FIGS. 18 and 19, there is shown another embodiment of the lock mechanism 30.

In this embodiment, a lock acceleration control member 53 is provided for controlling a movement of the weight 40. The control member 53 is pivotally supported by the retractor base 35 and urged downwardly by a tension spring 54. When the rear door 19 is closed, the weight 40 is carried by a weight support member 56 as shown in FIG. 18. When the rear door 29 is opened to turn the door switch 52 on, an upper end portion of the control member 53 is swung upwardly against a resilient force of the spring 54 so that an annular support portion 55 formed at an upper tip end portion of the control member 53 is brought into contact with a bottom portion of the weight 40. As a result, the weight 40 is stably carried by the annular support portion 55 which is larger than the weight support member 56 in diameter as shown in FIG. 19. This means that the lock mechanism 30 is difficult to actuate when the door 19 is opened compared with a door close condition. Thus, the same result as the former embodiment can be obtained Alternatively, in order to actuate the control member 53 in accordance with the open and close of the door 19, a link mechanism can be employed instead of the solenoid 51.

Figure 20:
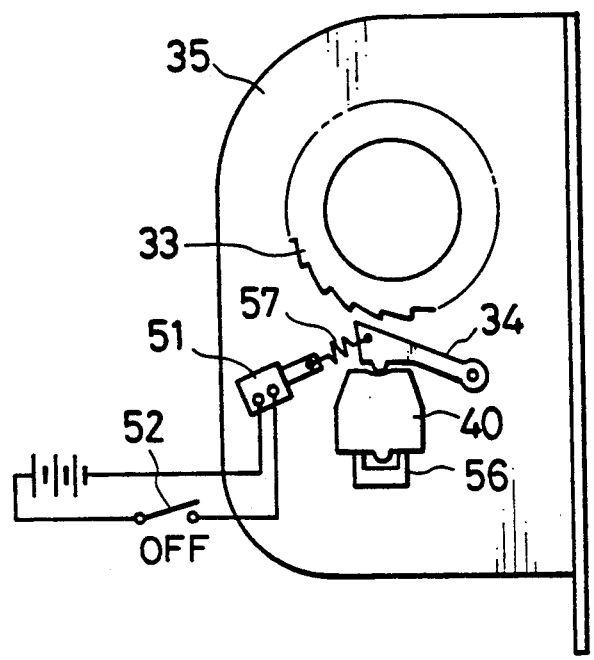
FIG. 20 is a side view of still another structure of the retractor.

Referring to FIG. 20, there is shown still another embodiment of the lock mechanism 30.

In this embodiment, the ratchet lever 34 is connected with the solenoid 51 through a tension spring 57. According to the illustrated embodiment, the solenoid 51 is actuated to expand the spring 27 to produce a tensional force when the door 19 is opened so that the weight 40 is hard to swing. This means that when the door 19 is opened, the lock mechanism 30 is difficult to actuate in comparison with a door close condition.

Figure 21:
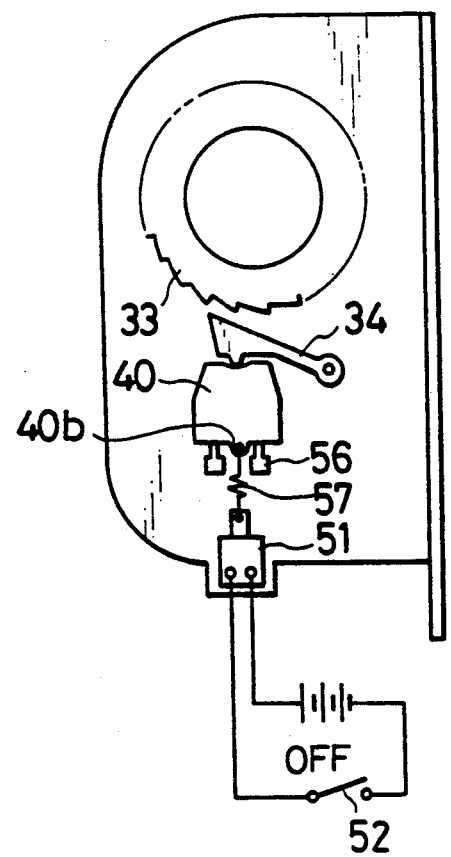
FIG. 21 is a side view of yet another structure of the retractor.

Referring to FIG. 21, there is shown yet another embodiment of the lock mechanism 30. In this embodiment, the tension spring 57 connects the solenoid 51 with the projection 40b of the weight 40 wherein the solenoid 51 is actuated to produce a tensional force in the spring when the door 19 is opened as well as the former embodiment.

Figure 22:
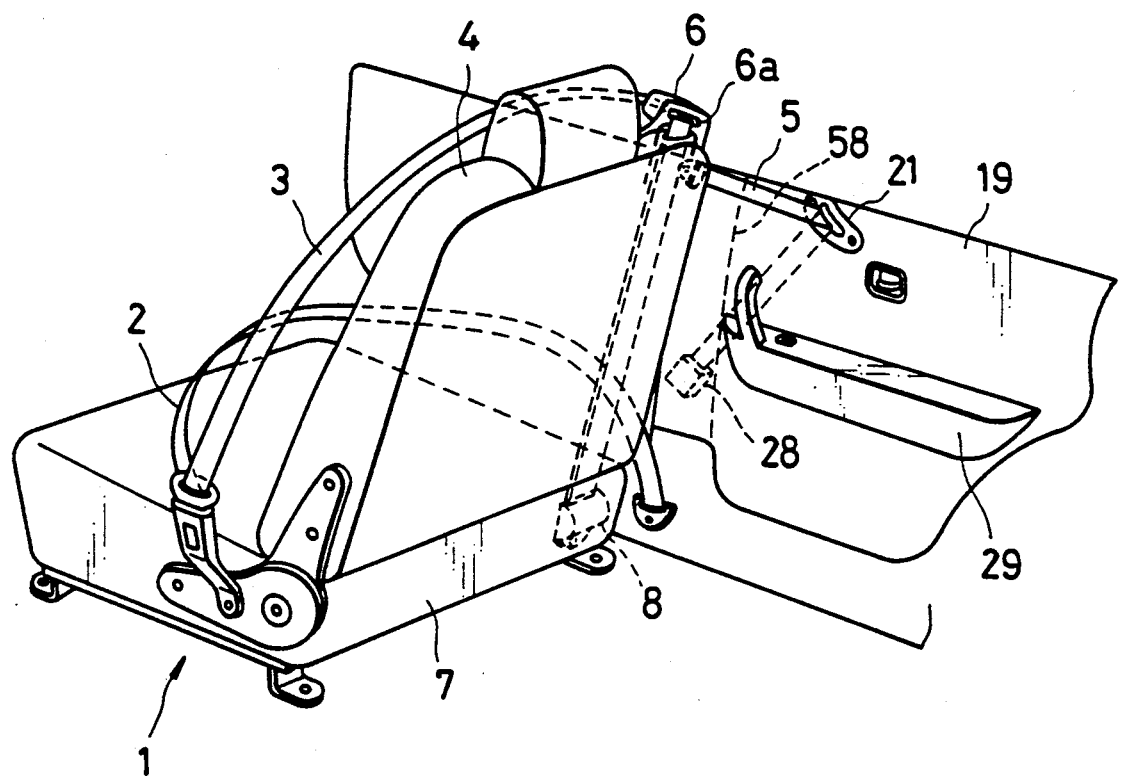
FIG. 22 is a perspective view showing a seat belt device in accordance with another embodiment of the present invention.
Figure 23:
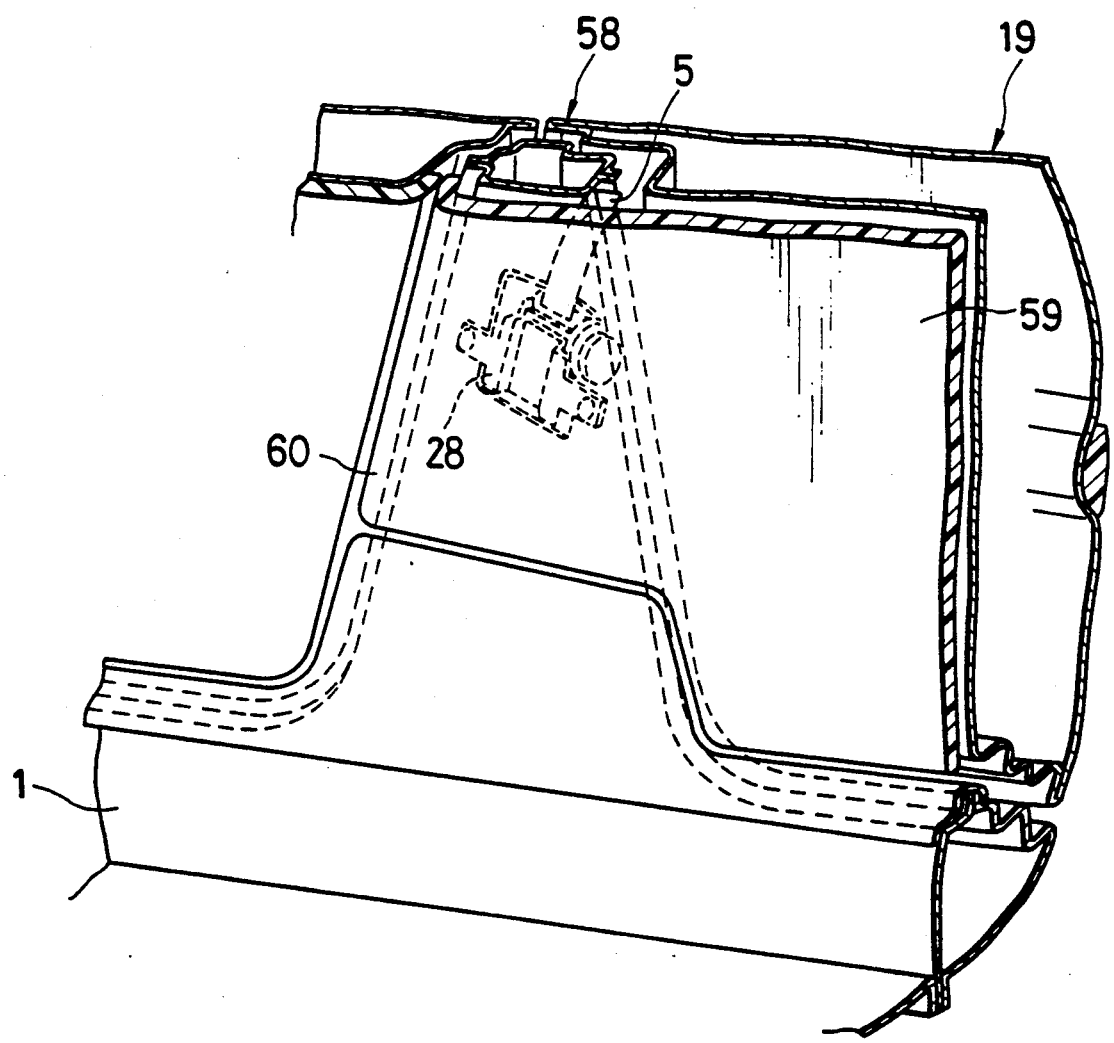
FIG. 23 is a perspective view showing a modification of a mounting position of the retractor.

Referring to FIGS. 22 and 23, the retractor 28 is mounted on a center pillar 58 as a body member facing to the rear door 19. The retractor 28 is covered by a front extension 60 of a trim member 59 of the rear door 19. With this structure, the lock mechanism is not affected by an opening and closing operation of the door 19, unlike the former embodiment.

Figure 24:
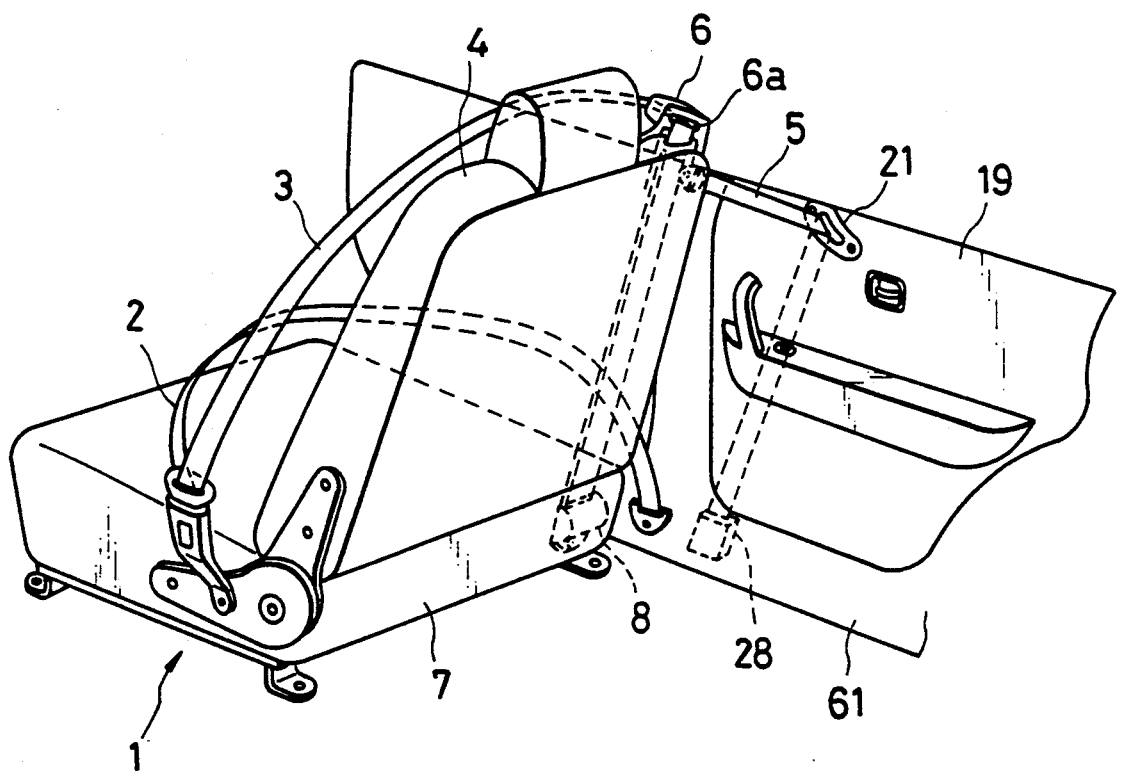
FIG. 24 is a perspective view showing another modification of a mounting position of the retractor.

The retractor 28 can be mounted on a side sill 61 as shown in FIG. 24.

Figure 25:
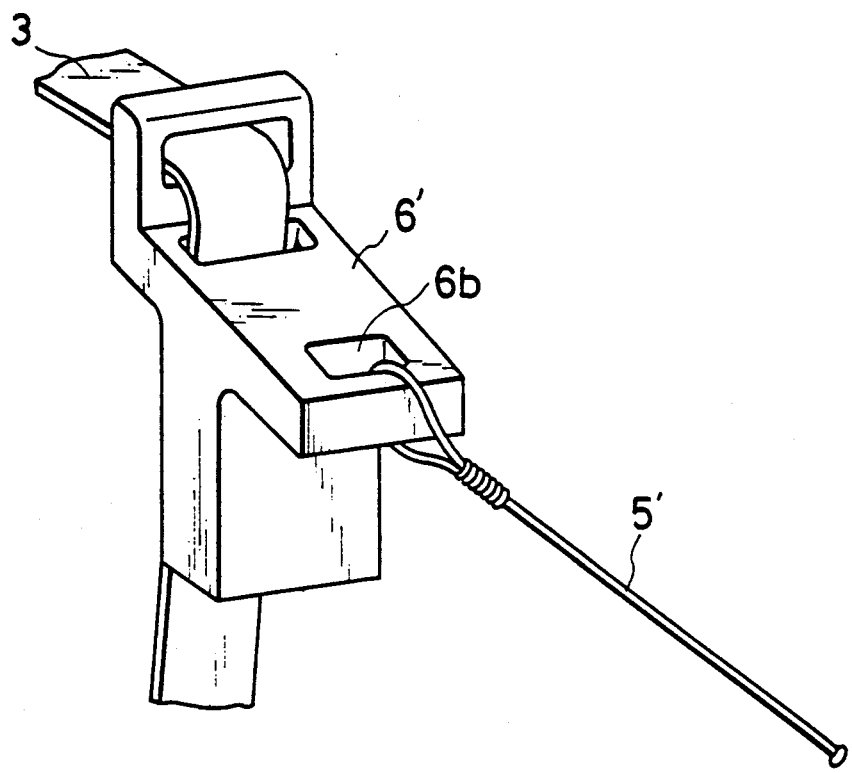
FIG. 25 is a perspective view showing a modification of the support strap.
Figure 26:
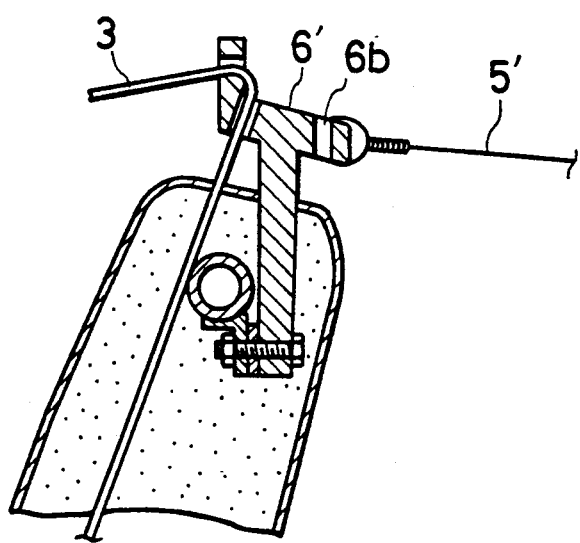
FIG. 26 is a sectional view showing guide member of FIG. 25.

In addition, the support strap 5 can be replaced by a string-like member or support wire member 5' as shown in FIGS. 25 and 26. The support wire member 5' is secured to a guide member 6' through a hole 6b.

Figure 27:
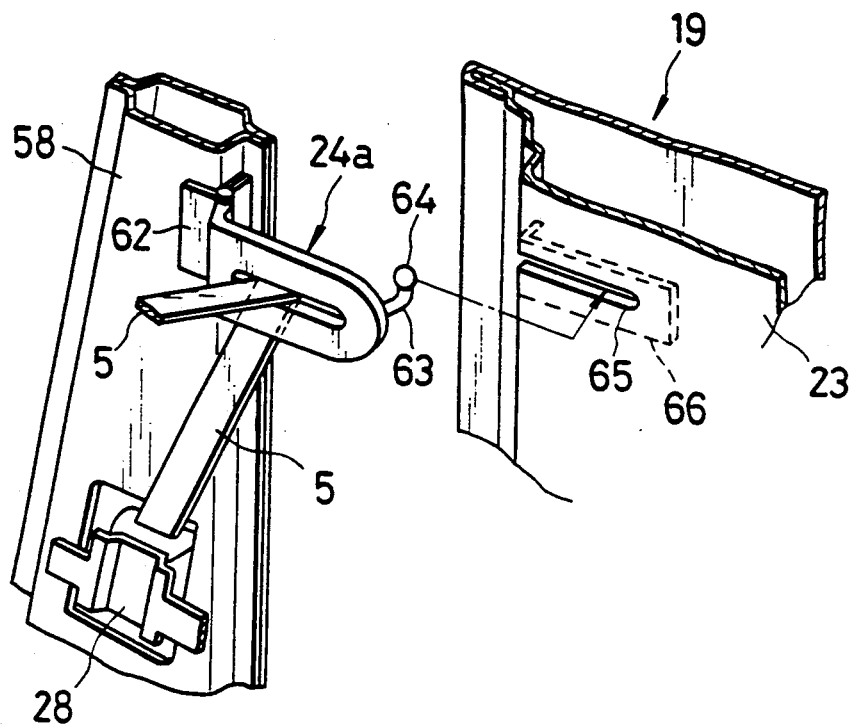
FIG. 27 is an exploded perspective view showing another embodiment of the anchor portion.
Figure 28:
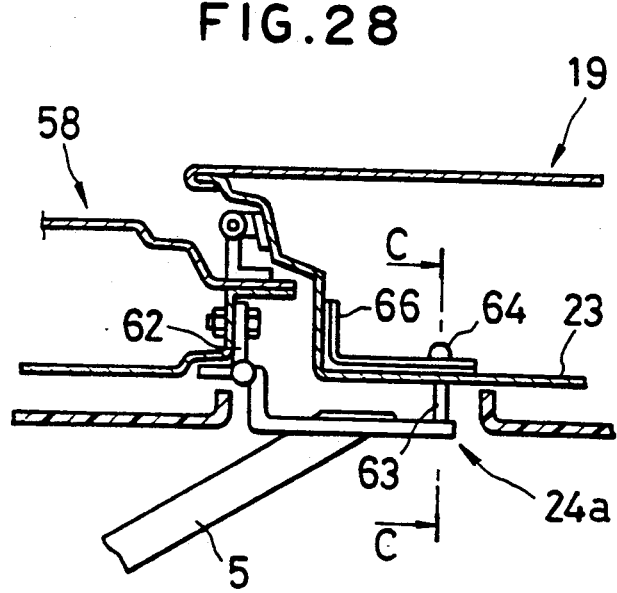
FIG. 28 is a sectional view showing the anchor portion of FIG. 27.
Figure 29:
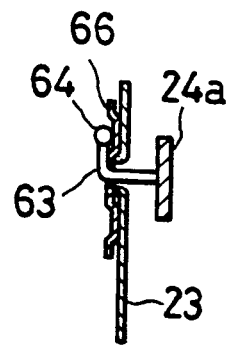
FIG. 29 is a sectional view taken along line C—C in FIG. 28.
Figure 30:
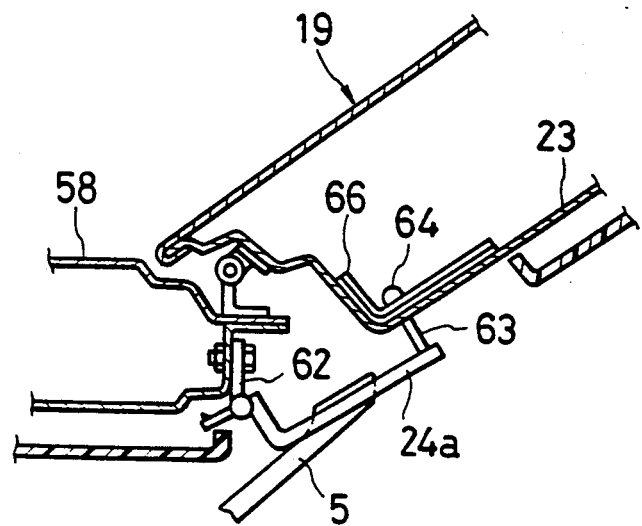
FIG. 30 is a sectional view showing the anchor portion in which a door is opened.

Referring to FIGS. 27 and 28, an anchor member 24a for carrying the support strap 5 is pivotally supported by a bracket 62 mounted on a body member such as the center pillar 58. The anchor member 24a is provided at a tip end thereof with a joint pin 63 extending rearwardly. The joint pin 63 is formed with an expanded portion 64 at a tip end thereof. The expanded portion 64 is brought into engagement with an elongated hole 65 formed in the inner panel 23 of the rear door 19 to secure the anchor member 24a to the door 19 as shown in FIG. 29. There is provided a reinforcement 66 for the elongated hole 65 so that a load acting on the support strap 5 can be effectively dispersed to both the center pillar 58 and the rear door 19. With this structure, the anchor member 24a can be rotatably moved with the door 19 in accordance with an opening and closing operation so that the anchor member 24a is always kept at a position adjacent to the door 19 as shown in FIG. 30. Therefore, the anchor member 24a does not interfere with a rear seat passenger when he gets on and off.

Figure 31:
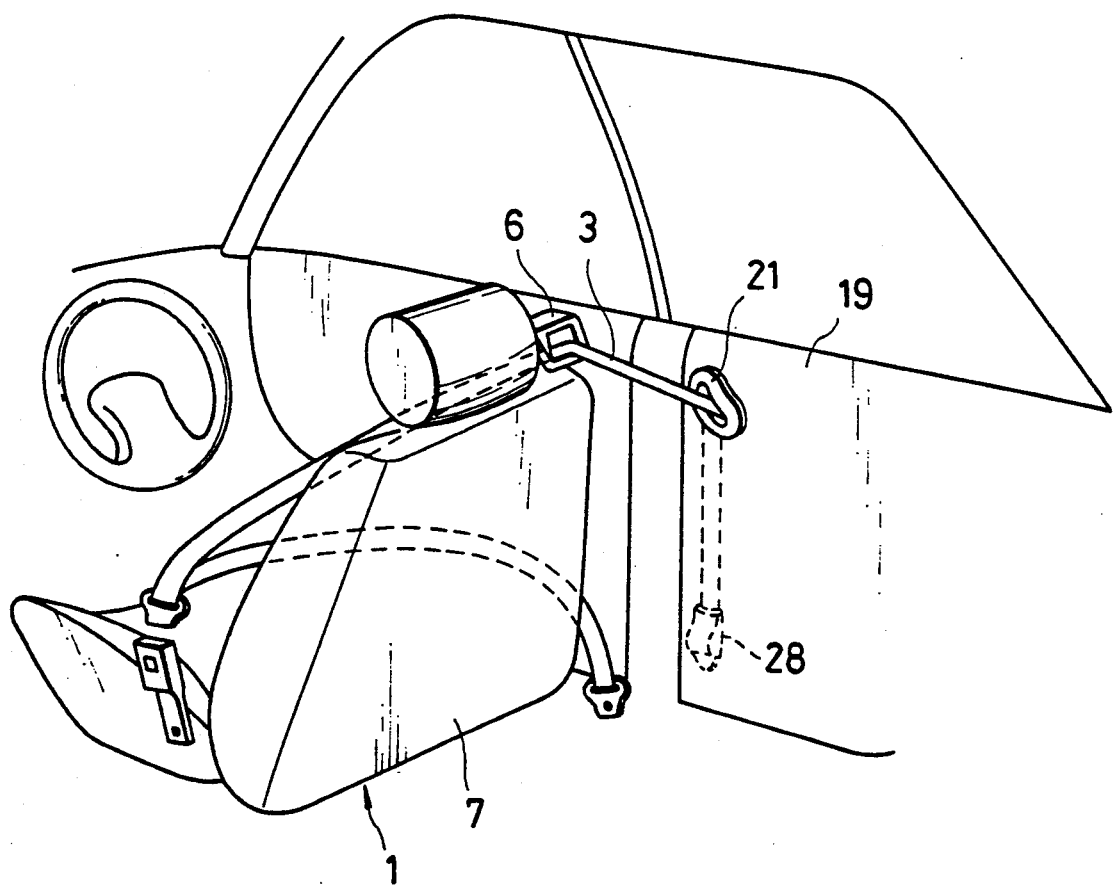
FIG. 31 is a perspective view showing another embodiment of anchor portion for a shoulder belt.

The structure of the anchor portion including the guide hole 22 can be applied for carrying not only the support strap 5 but also the shoulder belt 3 as shown in FIG. 31.

Figure 32:
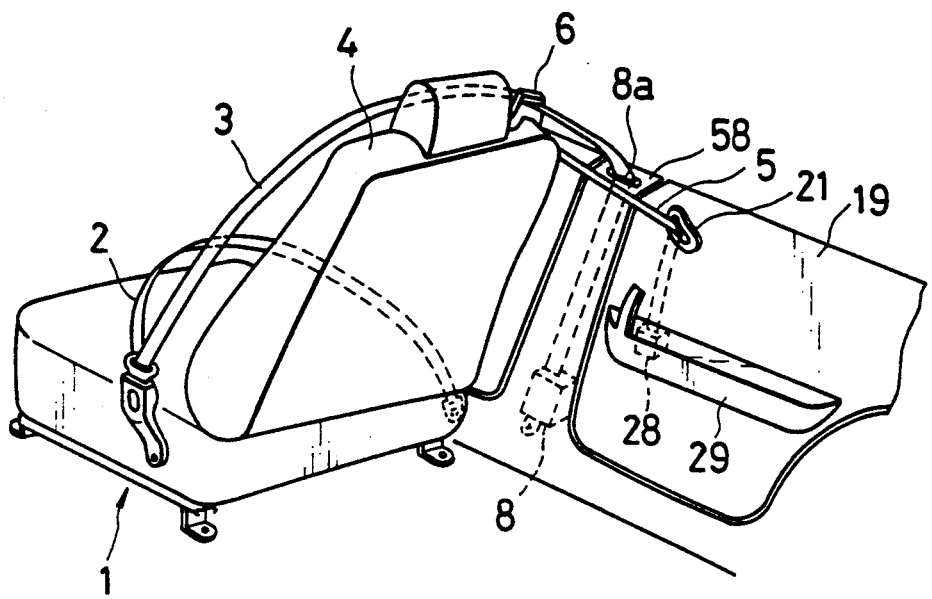
FIG. 32 is a perspective view of another embodiment of the seat belt device.
Figure 33:
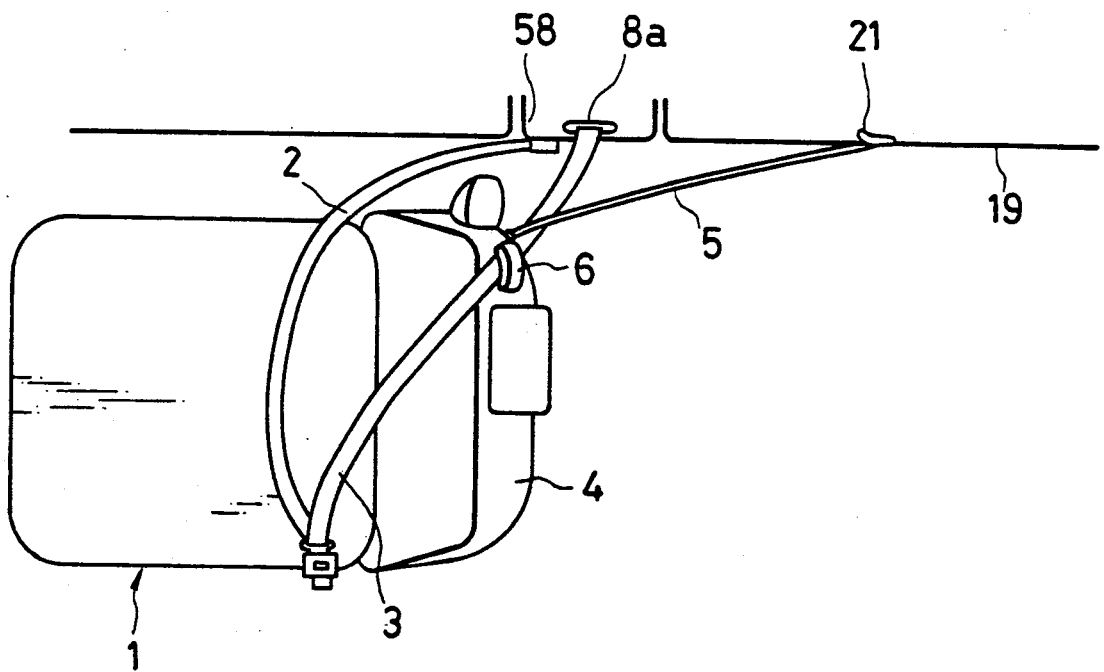
FIGS. 33 and 34 are plan views of the seat belt device of the embodiment of FIG. 32 in different longitudinal positions of the seat.
Figure 34:
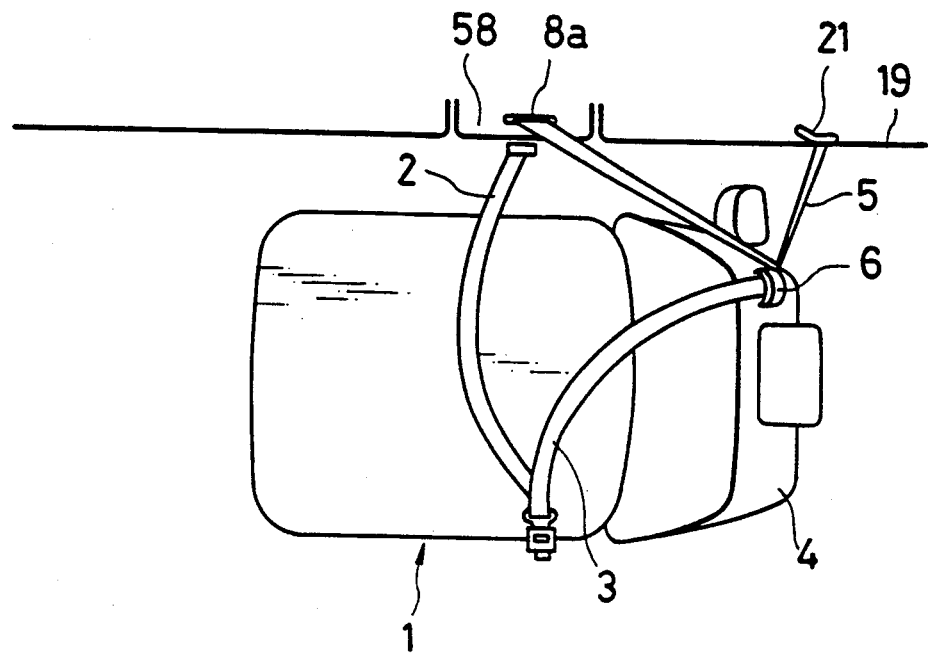

Referring to FIGS. 32, 33 and 34, there is shown another embodiment of the seat belt device in accordance with the present invention.

In this embodiment, the shoulder belt 3 is introduced into a center pillar 58 through an anchor portion 8a and connected with a retractor 8 mounted on the center pillar 58. According to the illustrated embodiment, a load acting on the seat belt device is carried by the center pillar 58 through the shoulder belt 3 and anchor portion 8a and the retractor 8 and by the rear door 19 through the support strap 5 and retractor 28.

Figure 35:
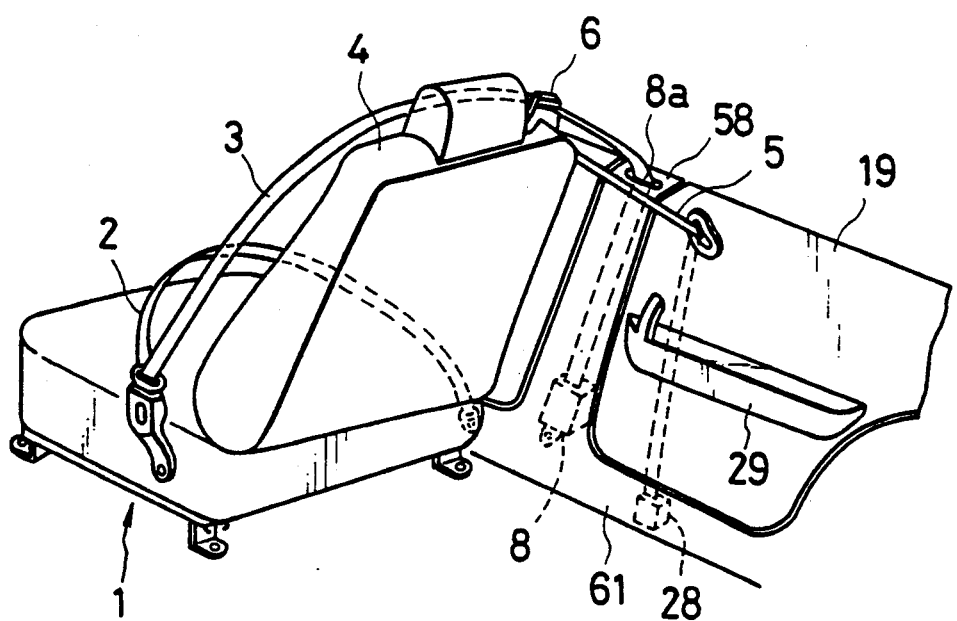
FIG. 35 is a perspective view of the seat belt device of still another embodiment.

In this embodiment, the retractor 28 can be mounted on a side sill 61 as shown in FIG. 35.

Figure 36:
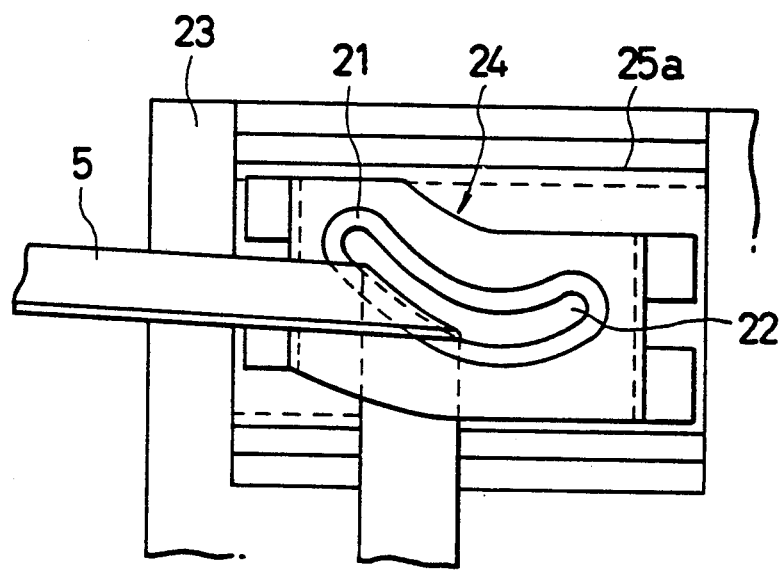
FIGS. 36 and 37 are fragmental views showing another structure of anchor portion of the device.
Figure 37:
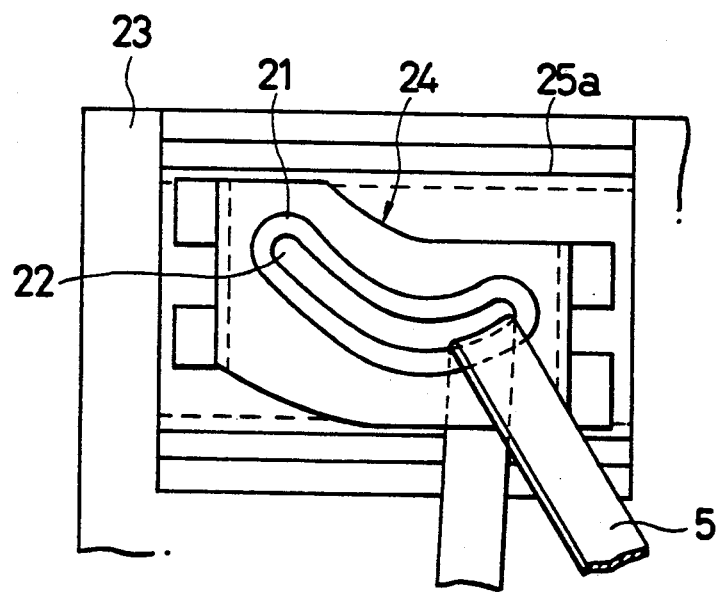
Figure 38:
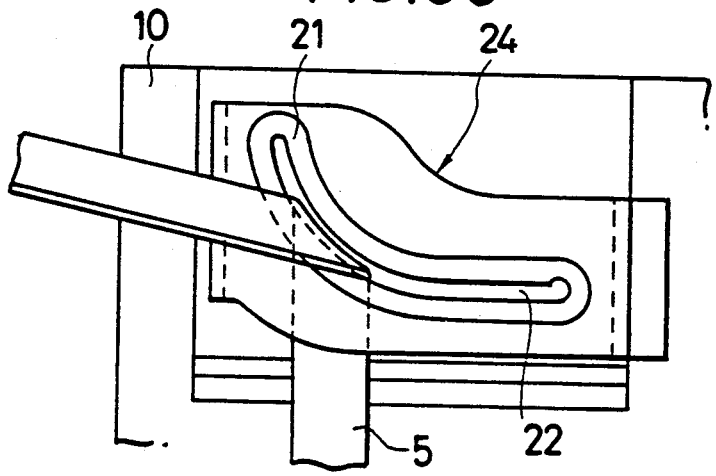
FIGS. 38 through 40 are fragmental views showing still another structure of anchor portion of the device.
Figure 39:
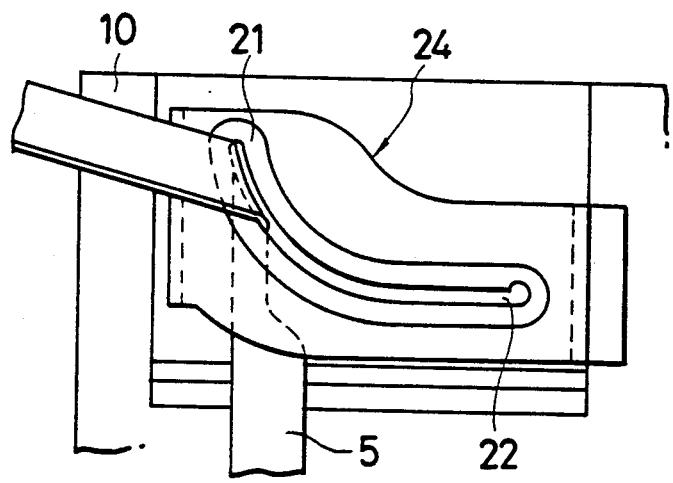
Figure 40:
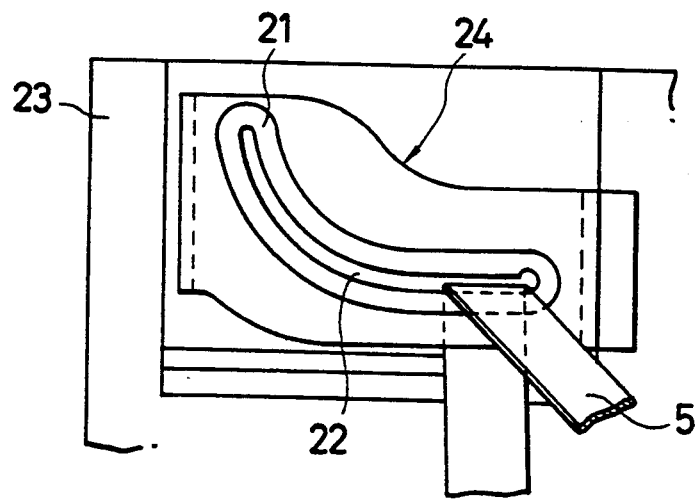

Referring to FIGS. 36 and 37, there are shown another structure of anchor portion of the device, FIGS. 38 through 40 show still another structure of anchor portion of the device.

It will be apparent that various modifications and improvements may be made based on the above descriptions by those skilled in the art without departing from the scope of the claims as attached.

We claim:

1. A seat belt device for fastening a passenger seated on a seat device of a vehicle, comprising:
    shoulder belt means, carried by a guide member fixed to a seat belt back member of the seat device, for embracing an upper body portion of the passenger;
    support means, fixed at one end to the seat back member and extending downwardly from the fixed end and rearwardly of the vehicle, for preventing said seat back member from moving forward during a collision;
    first anchor means mounted on a body member of the vehicle rearward of the seat back member for carrying the support means;
    retractor means mounted on a body member for winding to retract the support means;
    lock means provided in the retractor means for preventing the support means from being drawn out from the retractor means when a horizontal acceleration acting on the retractor means is greater than a predetermined value; and
    second anchor means mounted on a center pillar for carrying the shoulder belt means, the shoulder belt means extending through said guide member at a position lower than a window section;
    wherein said vehicle further comprises a rear door, the first anchor means is rotatably mounted on the center pillar, a joint member is provided at a tip end portion of the first anchor means, and the first anchor means is joined with said rear door through said joint member.

2. A seat belt device in accordance with claim 1, wherein the retractor means is mounted on the rear door.

3. A seat belt device in accordance with claim 1, further comprising another retractor means for winding to take up the shoulder belt means, the retractor means being located at a position lower than the last mentioned anchor means.

4. A seat belt device in accordance with claim 1, wherein the lock means comprises detecting means for detecting whether or not said vehicle door is opened and control means for actuating the lock means based on a signal from the detecting means.

5. A seat belt device in accordance with claim 1, further comprising another retractor means mounted on the seat back member for winding to take up the shoulder belt means carried by said guide means.

6. A seat belt device in accordance with claim 1, wherein the retractor means is covered by a trim member for said vehicle door.

7. A seat belt device in accordance with claim 1, wherein the support means comprises a belt member.

8. A seat belt device in accordance with claim 1, wherein the support means comprises a wire member.

9. A seat belt device in accordance with claim 1 wherein said vehicle door is without sash.

10. A seat belt device in accordance with claim 1, wherein the retractor means is mounted on an inner panel of said vehicle door at a position where an arm rest of a trim member provided inside of the inner panel is located.

11. A seat belt device in accordance with claim 1 wherein the lock means comprises a ratchet wheel having ratchets fixed to a winding shaft of the support means, a ratchet lever arranged for engagement with the ratchet wheel, actuating means for bringing the ratchet lever into engagement with the ratchets to restrict the support means from being drawn out from the winding shaft.

12. A seat belt device in accordance with claim 1 wherein the retractor means is provided, below first anchor means, for winding to take up the support means.

* * * * *